US010176097B2

(12) United States Patent
Choi et al.

(10) Patent No.: US 10,176,097 B2
(45) Date of Patent: Jan. 8, 2019

(54) ADAPTABLE DATA CACHING MECHANISM FOR IN-MEMORY CLUSTER COMPUTING

(71) Applicant: Samsung Electronics Co., Ltd., Suwon-si, Gyeonggi-do (KR)

(72) Inventors: Inseok Stephen Choi, Redwood City, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 404 days.

(21) Appl. No.: 14/712,895

(22) Filed: May 14, 2015

(65) Prior Publication Data

US 2016/0170882 A1    Jun. 16, 2016

Related U.S. Application Data

(60) Provisional application No. 62/092,827, filed on Dec. 16, 2014.

(51) Int. Cl.

| | | |
|---|---|---|
| *G06F 12/00* | (2006.01) | |
| *G06F 12/0806* | (2016.01) | |
| *G06F 3/06* | (2006.01) | |
| *G06F 12/0842* | (2016.01) | |
| *G06F 12/0868* | (2016.01) | |
| *G06F 12/0871* | (2016.01) | |
| *G06F 11/34* | (2006.01) | |

(52) U.S. Cl.
CPC ............ *G06F 12/0806* (2013.01); *G06F 3/06* (2013.01); *G06F 11/34* (2013.01); *G06F 12/0842* (2013.01); *G06F 12/0868* (2013.01); *G06F 12/0871* (2013.01); *G06F 2212/1021* (2013.01); *G06F 2212/1024* (2013.01); *G06F 2212/283* (2013.01); *G06F 2212/284* (2013.01); *G06F 2212/286* (2013.01); *G06F 2212/601* (2013.01); *G06F 2212/608* (2013.01)

(58) Field of Classification Search
CPC ...... G06F 15/7807; G06F 8/41; G06F 8/4441; G06F 11/34; G06F 2212/1024
USPC ......................................................... 711/119
See application file for complete search history.

(56) References Cited

U.S. PATENT DOCUMENTS

| | | | |
|---|---|---|---|
| 8,832,674 B2 | 9/2014 | Harris et al. | |
| 8,843,447 B2 * | 9/2014 | Molaro ................. | G06F 3/0619 707/640 |
| 2004/0162941 A1 * | 8/2004 | Aigo .................... | G06F 3/0613 711/114 |
| 2011/0093726 A1 | 4/2011 | Worthington et al. | |
| 2012/0215970 A1 | 8/2012 | Shats | |
| 2013/0173853 A1 | 7/2013 | Ungureanu et al. | |
| 2014/0122778 A1 * | 5/2014 | O'Brien ................. | G06F 3/061 711/103 |

(Continued)

*Primary Examiner* — Mardochee Chery
(74) *Attorney, Agent, or Firm* — Renaissance IP Law Group LLP

(57) ABSTRACT

An in-memory cluster computing framework node is described. The node includes storage devices having various priorities. The node also includes a resource monitor to monitor the operation of the storage devices. The node also includes a resource scheduler. When the resource monitor indicates that a storage device is at or approaching saturation, the resource scheduler can migrate data from that storage device to another storage device of lower priority.

24 Claims, 9 Drawing Sheets

(56) References Cited

U.S. PATENT DOCUMENTS

2014/0149365 A1 5/2014 Minborg
2014/0258595 A1 9/2014 Venkatesha et al.

* cited by examiner

ADAPTABLE DATA CACHING MECHANISM FOR IN-MEMORY CLUSTER COMPUTING

RELATED APPLICATION DATA

This application claims the benefit of U.S. Provisional Patent Application Ser. No. 62/092,827, filed Dec. 16, 2014, which is hereby incorporated by reference for all purposes.

FIELD

The invention pertains to storage, and more particularly to using storage in cluster computing.

BACKGROUND

In-memory cluster computing frameworks are a key component of the modern computing era, and provide an economically viable alternative to specially-built supercomputers. Cluster computing frameworks use commodity hardware that is easily and cheaply obtained. For example, a cluster of personal computers can be networked together to provide computing power that compares favorably (price-wise, if not in terms of physical space) with a supercomputer.

But whereas traditional operating systems work well with individual personal computers that are not organized in a cluster, some special software is needed to make a cluster of personal computers work together. Apache Spark™, an example of such software, is growing quickly, and internet-service companies such as Google, Facebook, and Amazon are considering Apache Spark seriously. (Apache, Apache Spark, and Spark are trademarks of The Apache Software Foundation.) Moreover, SAP®, Cloudera™, MapR™, and Datastax are pursuing their efforts to make new products on top of Apache Spark framework. (SAP is a registered trademark of SAP SE in the United States and other countries. Cloudera is a trademark of Cloudera, Inc. MapR is a trademark of MapR Technologies Inc.)

Apache Spark is well-known for its capability to provide "memory-speed" computations, especially for, but not limited to, iterative, big-data analytics and real-time applications. To achieve such a great performance improvement compared to existing distributed computing platforms such as Apache Hadoop™, Apache Spark needs to keep its data in the memory of the clusters for fast computation in "resilient distributed dataset" (RDD) format. (Apache Hadoop and Hadoop are trademarks of The Apache Software Foundation.)

Existing Apache Spark implementations utilize the memory heap space of Java Virtual Machines (JVM), but this introduces significant performance degradation due to the needed Garbage Collection (GC) time. The GC event pauses the whole JVM and thus literally stops the whole execution.

To alleviate such high costs for maintaining RDD in the memory space of Java, Apache Spark developers came up with another solution, called "Tachyon". Tachyon utilizes RAMDisks to cache RDD in memory without triggering the GC event in the JVM, while also maintaining the file system in the memory system. Tachyon not only eliminates GC overhead, but provides better separation between the execution engine (Apache Spark) and the storage/cache engine (Tachyon), because Tachyon runs as a different process and is controlled by a central manager which can also be fault-tolerant with other application such as Zookeeper.

But despite such efforts from the Apache Spark community, performance bottlenecks still exist in Apache Spark and Tachyon. By sharing memory space in the same memory system, both Apache Spark and Tachyon demand high memory bandwidth. Due to this bandwidth sharing, Apache Spark cannot achieve maximum performance.

Moreover, Tachyon, by itself, does not provide any fault tolerance, but relies on the fault tolerances of the storage systems that it relies on. This lack of fault tolerance within Tachyon can be a serious problem in the case where system engineers optimize cluster system configurations to squeeze the best performance out of the system by mounting non-fault tolerant memory/storage systems for Tachyon implementation.

While the above description focuses on Apache Spark and Tachyon, the problem with determining which devices cache data can potentially be found in any cluster computing framework.

A need remains to better manage the caching of data in a cluster computing framework that solves this and other problems.

DETAILED DESCRIPTION

In-memory cluster computing allows data caching not only by data-movement oriented classical caching (temporal and spatial localities), but also by allowing programmer-enforced/suggested data caching. An example of such in-memory cluster computing framework systems is Apache Spark. In the Apache Spark JVM, the execution engine can share its memory location to cache such datasets, which might be stored, for example, in the Java heap space. But this arrangement can result in a huge performance overhead to maintain such datasets in the memory and to keep it live. Moreover, it is not reliable because the execution engine's failure would result in data loss. To alleviate these problems, separated processes can take care of cached data. For example, Tachyon was proposed by the Apache Spark community to address these issues. But Tachyon does not solve more fundamental problems, such as bandwidth and capacity sharing. The problem with Tachyon is that the execution and the storage engine both access the memory: the execution engine to compute, and the storage engine to read/write cached data. This structure not only makes the memory bandwidth a bottleneck, but exacerbates a limited memory space problem as well. Nor are these problems limited to Apache Spark and Tachyon: other in-memory cluster computing frameworks can suffer from similar problems.

Figure 1:
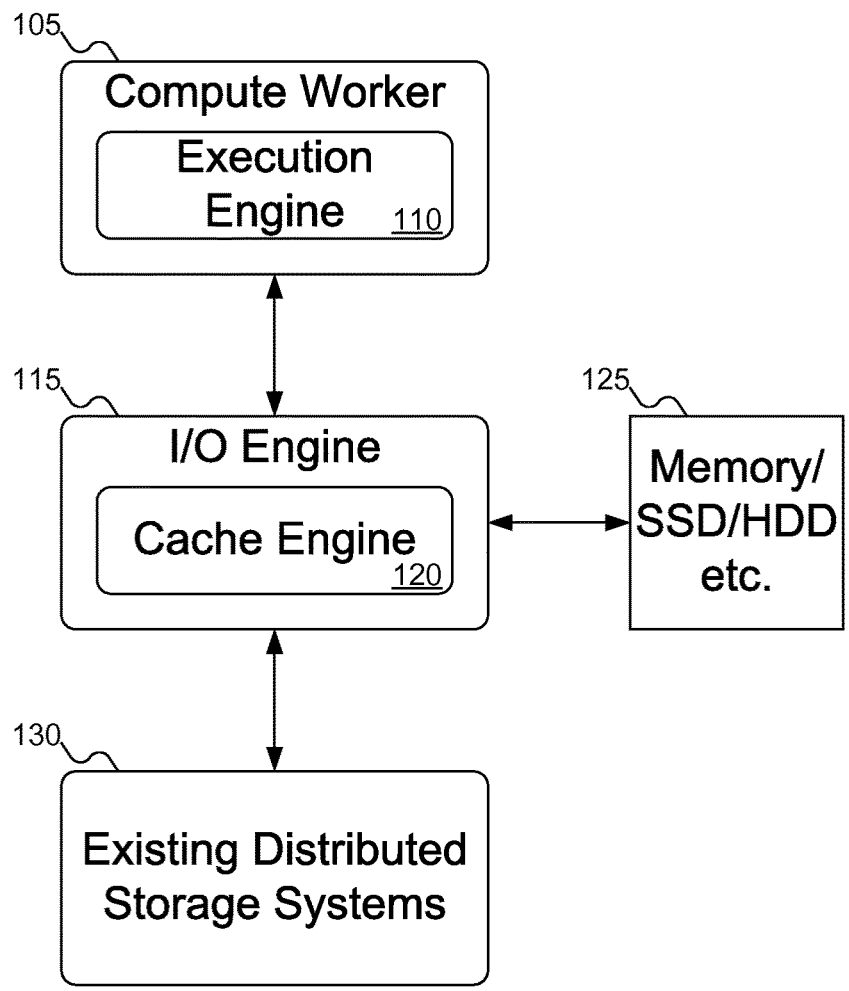
FIG. 1 shows a prior art node in a cluster computing framework.

FIG. 1 shows a node in some common, existing cluster computing frameworks. A person of ordinary skill in the art will understand that FIG. 1 is an abstraction of the entire node representation. This abstraction simplifies understanding of the operation of the existing computing framework and is useful for understanding the advancements of this disclosure.

In FIG. 1, compute worker 105 includes execution engine 110, which executes an application. Compute worker 105 interfaces with I/O engine 115, which includes cache engine 120. Cache engine 120 is responsible for managing the caching of data in memory only. I/O engine 115 interfaces with various storage devices 125, which can include memory, Solid State Drives (SSDs), Hard Disk Drives (HDDs), and other storage devices. I/O engine 115 also interfaces with existing distributed storage systems 130, which provide distributed storage possibilities.

In existing cluster nodes, there can be many different ways to store data: for example, Dynamic Random Access Memory (DRAM), Storage Class Memory (SCM), or other memory, fast SSDs, slow SSDs, fast hard disk drives (HDDs), slow HDDs, and distributed storage systems. (In some embodiments of the invention, memory is considered to be a storage device, even though memory tends to be used differently from other storage devices.) Because the various storage devices have different bandwidth/capacity characteristics, there is no one-size-fits-all solution. For example, memory caching may be advantageous for compute-intensive benchmarking with a smaller working set size (memory footprint). But alternatively, SSD-caching may be advantageous for an I/O-intensive benchmark, or a benchmark with a large persistent RDD (programmer-directed cached data). For example, PageRank on Apache Spark can benefit from caching RDDs in a high-performance SSD. As a result, embodiments of the invention can include a resource- and demand-aware mechanism to determine the best-performing storage device in an in-memory cluster computing environment, so as to select the best-performing storage device given the application being executed. Such a mechanism can also select the best method and storage device to provide fault tolerance as well.

Embodiments of the invention include a resource- and demand-aware caching mechanism as an intermediate layer between the execution engine and the distributed storage system to cache data such as RDD in Apache Spark. The execution engine sends data read/write request to the I/O engine for this caching layer and the I/O engine responds to these requests. Embodiments of the invention introduce new components, such as a resource monitor and a resource selector.

Figure 2:
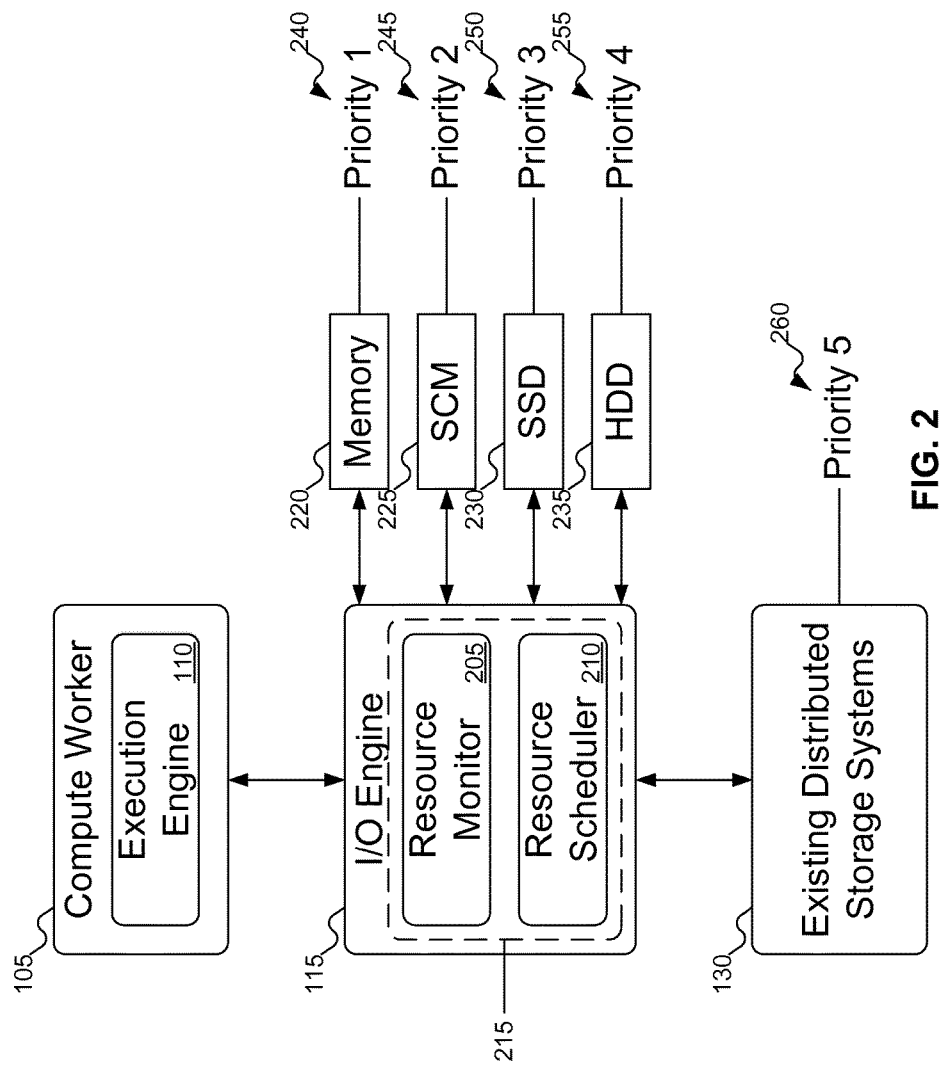
FIG. 2 shows a node in a cluster computing framework, according to an embodiment of the invention.

FIG. 2 shows a node in a cluster computing framework, according to an embodiment of the invention. In FIG. 2, compute worker 105 and existing distributed storage systems 130 are unchanged from FIG. 1. But I/O engine 115 from FIG. 1 now includes resource monitor 205 and resource scheduler 210. Together, resource monitor 205 and resource scheduler 210 can be considered as caching mechanism 215. Resource monitor 205 can monitor the operation of various storage devices available to the node. Resource scheduler 210 takes the information determined by resource monitor 205 and can decide whether the current devices provide adequate caching support for the data stored thereon and for potential future caching requests. If resource scheduler 210 decides that the current devices do not provide adequate caching support, then resource scheduler 210 can change what data is cached on what device.

In FIG. 2, memory 220, SCM 225, SSD 230 and HDD 235 are identified separately, as each can be used to cache data for applications. The use of other forms of storage is also possible. SCM is a new variety of storage, designed to bridge the gap between memory, such as DRAM, and other storage devices, such as SSDs and HDDs. SCM is designed to have performance characteristics similar to DRAM, but with cost and capacity closer to HDDs. In addition, although a single storage device could be used to cache all data for all applications, it is also possible for different storage devices to be used to cache data for different programs. Thus, memory 220 might cache a first data, SCM 225 might cache a second data, SSD 230 might cache a third data, and HDD 235 might cache a fourth data.

Resource monitor 205 and resource selector 210 can recognize different devices for caching. For a simple computation, information about devices can be kept in a sorted order. The sorting metric can be bandwidth, latency, capacity, etc. For example, sorting devices based on latency, the sorted order might be: memory 220>SCM 225>SSD 230>local HDD 235>distributed storage 130. But a person skilled in the art will recognize that more complicated computations can be used, with different sorting metrics. Resource monitor 205 can determine the performance characteristics for the storage devices, and resource selector 210 can then prioritize the storage devices based on whatever sorting metric is chosen. Resource selector 210 can select the sorting metric, or the sorting metric can be chosen by another component of the system, such as the operating system.

The performance characteristics of the storage devices and the sorting metric can be determined in advance, since the sorting metric typically is independent of the actual use of the storage device. For example, latency depends on how long it takes to access data, which does not depend on how much or how little data is stored on the storage device. A person skilled in the art will recognize other possible sorting metrics. For example, bandwidth might be used as a sorting metric, where devices that can provide greater throughput of data are considered higher priority.

The performance characteristics can also be determined by analyzing the performance of the storage device during run-time. For example, resource monitor 205 can track the operations of memory 220, SCM 225, SSD, 230, local HDD 235, and distributed storage 130, along with any other storage devices that might be available to the cluster computing node to determine their maximum bandwidth and their bandwidth utilization. Resource monitor 205 can determine bandwidth utilization, for example, by monitoring how much data moves to and from the storage device for a given interval of time. As a more specific example, resource monitor 205 might monitor a storage device for 5 ms and detect 1 MB of data being sent to or from the device. From this, resource monitor 205 can calculate the average measured bandwidth as 200 MB/sec. By comparing this calculation with the maximum available bandwidth for the device, resource monitor 205 can calculate a bandwidth utilization percentage. Resource monitor 205 can perform this analysis at intervals to track the overall bandwidth utilization rate of the storage devices over time, and if a storage device is approaching its bandwidth limits, resource monitor 205 can indicate that data should be migrated to another storage device. (Resource monitor 205 can also perform continuous analysis of the bandwidth of the storage devices, rather than periodic analysis.)

As another example, resource monitor 205 can determine latency by calculating how long a device takes between receiving a data request and returning the result of the data request. Averaging such calculations over a number of data requests can provide a reasonable estimate of the latency of the storage device.

Resource monitor 205 can also test the storage devices. For example, resource monitor 205 can wait until one or more of the storage devices is not being utilized (or is minimally utilized), as might occur during overnight hours. Resource monitor 205 can then test the storage devices to compute the performance characteristics of the storage devices with minimal impact to user operations. For example, resource monitor 205 can write a very large file to measure how long it take and determine the bandwidth of the storage device. Or, resource monitor 205 can request the storage device to read a particular address and measure how long the storage device takes to respond (thereby measuring its latency). Or, resource monitor 205 can request the storage device to advise how much data it currently stores: relative to the overall capacity of the storage device, this calculation can measure the storage device's fullness.

FIG. 2 also shows priorities for the various storage devices. Memory 220 has priority 240, SCM 225 has priority 245, SSD 230 has priority 250, HDD 235 has priority 255, and distributed storage system 130 has priority 260. Each storage device, and each storage device class, can have its own priority, based on any desired sorting metric. There can be any number of storage devices or storage device classes: embodiments of the claimed invention are not limited to the number of storage devices shown in FIG. 2. In addition, there is no requirement that different devices have different priorities. For example, two devices might have the same priority using a particular sorting metric. In such a situation, a secondary sorting metric could be used to distinguish among the devices, or the system can arbitrarily select one device or another when data needs to be cached.

In the example cluster computing framework node of FIG. 2, caching mechanism 215 can start with a static configuration, if one is provided to it. For example, an application might specify a particular storage device (or device class) as the preferred caching device. Alternatively, caching mechanism 215 can start with a device of the highest priority (such as memory, when using the latency sorting metric in the example above). When resource monitor 205 detects that a storage device is experiencing saturation—for example, the available bandwidth of the storage device is at or approaching its maximum (bandwidth saturation) or the storage device is at or approaching the maximum amount of data it can store (capacity saturation)—resource selector 210 can change the caching device to a device with the next highest priority and migrate cached data, or requests to cache data, onto it. As noted, resource scheduler 210 does not need to wait until the storage device is fully saturated: resource scheduler 210 can migrate data or re-route data cache requests when the storage device is approaching saturation, which can be determined, for example, as a threshold percentage (such as 90%) of full saturation. Any desired threshold percentage can be used: the use of 90% above is merely exemplary. The migrated cached data, or requests to cache data, can include all data, or just selected data (such as the oldest cached data on the device). If there is no further device with lower priority, resource selector 210 can continue to working with the current device. Likewise, caching mechanism 215 can detect when a caching device is under-utilized, and can move data to a lower priority device if the usage pattern fits within that lower device's profiles.

Regardless of the source of the configuration information, data storage typically begins with a device with a priority acceptable to the application. So long as the selected storage device can provide adequate caching support, there is no need to migrate the data or cache requests. Data is migrated if the selected device caching the data does not (or does not appear to) provide acceptable levels of service.

According to this disclosure, data and cache requests need not necessarily migrate from higher priority devices to lower priority devices. Resource scheduler 210 can also check to see if a higher priority device is able to provide adequate service and, if so, can migrate data/cache requests back to the higher priority device.

As noted above, resource scheduler 210 can migrate not only cached data, but requests to cache new data. In some embodiments of the invention, the fact that one device is considered saturated can have an impact on future data caching. For example, if a particular device is sufficiently saturated that data needs to be migrated off the device, that fact suggests that the device might still be saturated in the foreseeable future. Therefore, future data should not be cached on the device. But in other embodiments of the invention, the fact that the resource scheduler migrates data from one device to another does not impact the selection of an initial device to cache future data. That is, the selection of the initial device to cache future data may not depend on whether a device was considered saturated, and a device that was previously considered to be saturated can still be selected to cache new data.

Whether there is a causal relationship between migrating cached data off a device and that device's ability to cache data in the future is variable. For example, if there is one particular dataset that dominates the device's capabilities, migrating that dataset off the device might leave the device sufficiently unsaturated that the device can cache future data. On the other hand, if the data stored on the device is fairly uniform in size, a significant percentage of data might have to be moved off the storage device before the device would become less saturated. In that situation, migrating a few datasets off the storage device might not improve the saturation of the device, in which case future cache requests are likely better directed toward another device.

Figure 3:
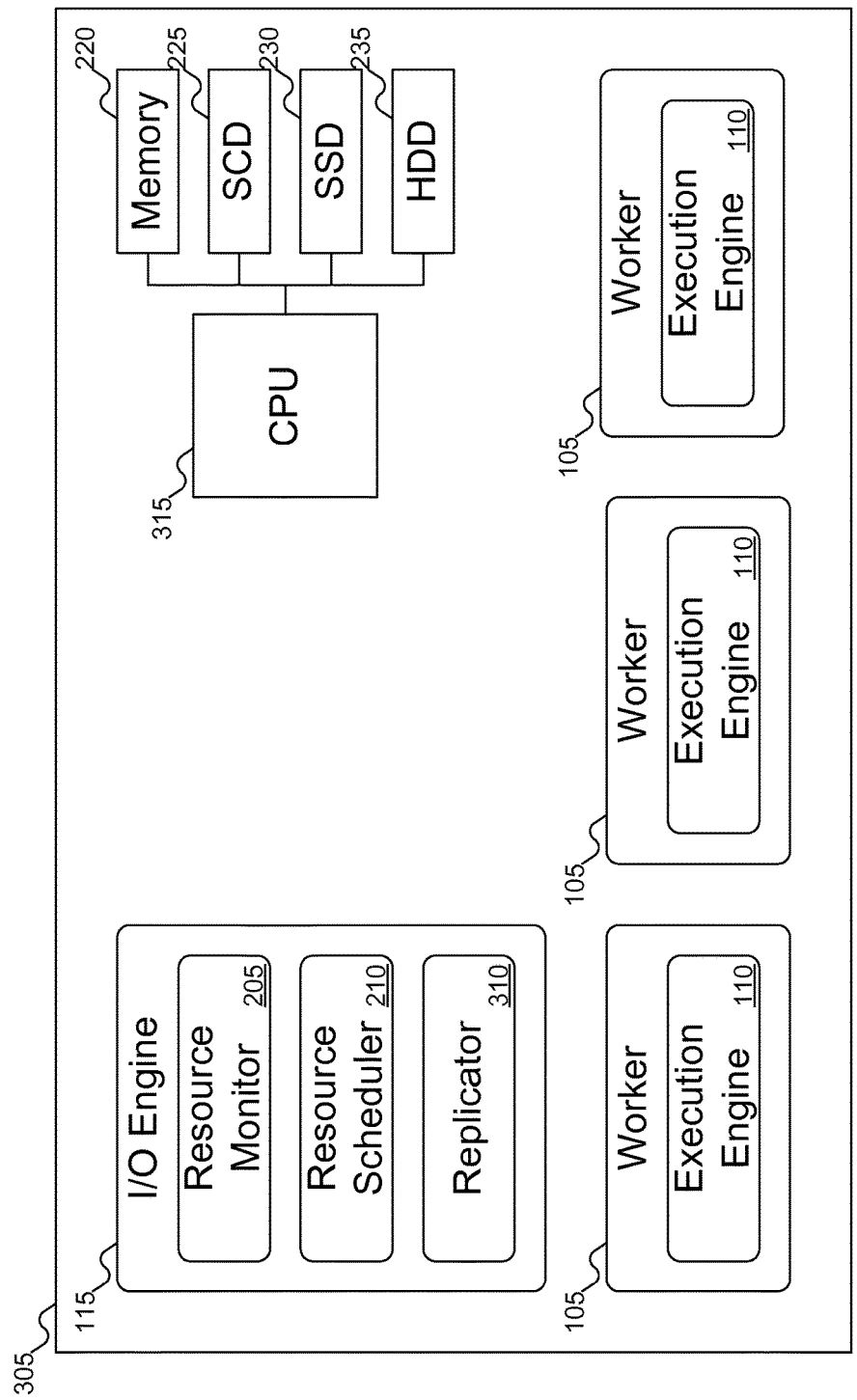
FIG. 3 shows more detail about the node of FIG. 2.

FIG. 3 shows an example node in the cluster computing framework, according to some embodiments of the invention. In FIG. 3, node 305 is shown, which a person of ordinary skill in the art will recognize is typically one of many nodes in the cluster. Node 305 can include multiple workers 105, each with its own execution engine 110 for executing applications. I/O engine 115 can include resource monitor 205, resource scheduler 210, and replicator 310. As discussed below, embodiments of the claimed invention can include replication of data to provide a measure of fault tolerance that might otherwise not be present in the cluster computing framework.

Node 305 can also include CPU 315, which can execute instructions for the various workers 105, and storage devices such as memory 220, SCD 225, SSD 230, and HDD 235.

As described above, resource monitor 205 can determine what the capabilities are of the various storage devices. By determining the capabilities of the storage devices, it becomes possible for resource scheduler 210 to know whether one or more of the storage devices are reaching the limits of its capabilities. Resource monitor 205 can determine the capabilities of the storage devices in several different manners.

Figure 4:
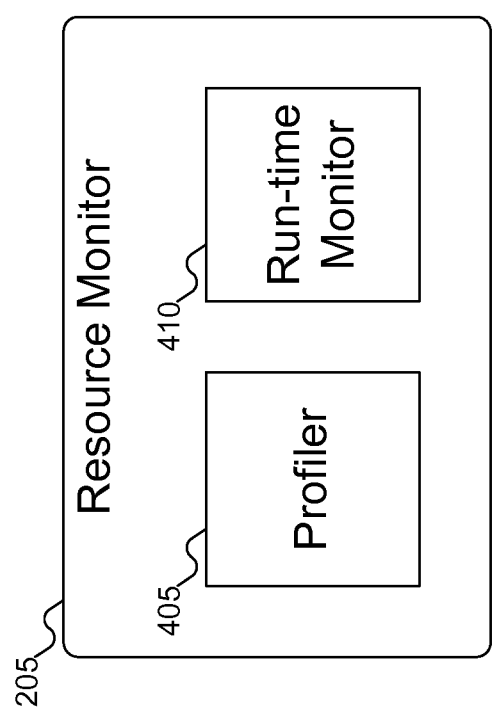
FIG. 4 shows details about the resource monitor of FIG. 2.

As shown in FIG. 4, in one embodiment of the invention, resource monitor 205 can include profiler 405. Profiler 405 can access the various storage devices and determine their capabilities. There are many different techniques by which profiler 405 can determine the capabilities of the storage devices. For example, profiler 405 can access the storage devices and read their capabilities directly from the devices, if the devices include such information in electronic form. Or, profiler 405 can determine a model number from the devices, and then access their capabilities off a website on the Internet, or from an internal storage listing device capabilities. Profiler 405 can also determine the device capabilities and then store those capabilities for future reference. Or, profiler 405 can perform read/write operations on the device to determine its capabilities, possibly measured against time. For example, a device's latency can be determined by measuring how many milliseconds it takes between a read/write command and the result being returned. Or a device's bandwidth can be determined by reading/writing a large amount of data relative to the amount of time it takes to complete the command. A person of ordinary skill in the art will recognize that there are other ways in which a device's capabilities can be determined. A device's capabilities can be determined in advance of the use of the node, and accessed from some storage. In this manner, the capabilities of the devices can be determined statically.

In another embodiment of the invention, the capabilities of the devices can be determined dynamically. In this embodiment, run-time monitor 410 can be used. Run-time monitor 410 can monitor the operation of the various storage devices during their ordinary operation to determine the capabilities of the storage devices. For example, run-time monitor 410 can measure the time between a request to read/write data from a storage device and when the result is returned to determine the latency of the storage device. Or run-time monitor 410 can measure the time it takes to read/write a large amount of data to determine the bandwidth of the device.

In addition, in some embodiments of the invention, run-time monitor 410 can be used to determine the current operation of the storage devices. That is, instead of determining, for example, the bandwidth of a device, run-time monitor 410 can determine the current bandwidth of the device being used. This measurement enables the resource scheduler to determine whether or not cached data, or requests to cache data, need to be migrated from one storage device to another. While this example considers the bandwidth saturation of the storage device, a person skilled in the art will recognize that any capability of the device can be measured: for example, the capacity saturation of the device (i.e., how much data the device is currently storing).

Resource selector 210 of FIG. 2 can also provide resource-aware fault tolerance. Resource selector 210 can provide redundant data copies via other devices. In addition, resource selector 210 can provide redundant copies in the same node or in other cluster nodes. Resource selector 210 can provide a configurable redundant ratio via a replication factor. Resource selector 210 can also provide a configurable frequency via check-point interval parameters in the case where check-pointing was selected as a fault tolerance method. Check-pointed RDDs can also be replicated via a replication factor if the user specifies the redundant factor along with check-pointing interval. In this case, resource selector 210 can provide fault tolerance redundantly (replication and check-pointing).

To provide some examples, if DRAM is selected as a caching device, resource selector 210 can provide fault tolerance based on check-pointing to the next (non-volatile) device (i.e. PRAM, SCD, SSD, HDD, distributed storage, or the like). If SSD is selected as a caching device, resource selector 210 can provide fault tolerance based either on replication to other SSDs, check-pointing to other device types, or both. If HDD is selected as a caching device, resource selector 210 can provide fault tolerance based either on replication to other HDDs, check-pointing to other device types, or both. In addition, in all of these examples the replication or check-pointing can be done to storage devices on the same cluster node or on a different cluster node. Having redundant data across different cluster nodes enables protection against node failure and, if the nodes are on different server racks, protection against rack-power failure. Where fault tolerance is provided on different cluster nodes, resource selector 210 tasks in the various cluster nodes can communicate with each other to provide inter-node replication and check-pointing.

Figure 5A:
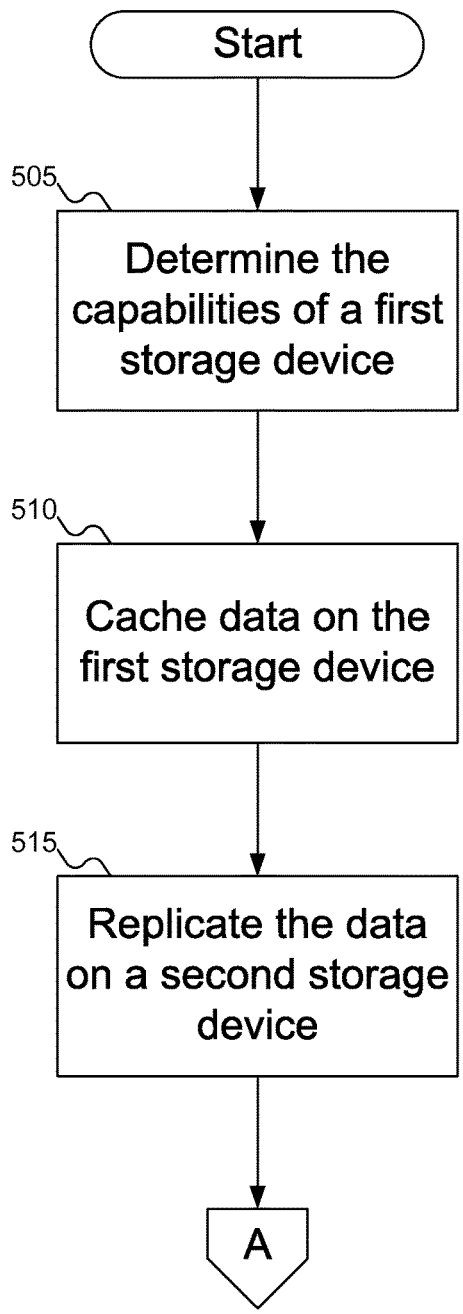
FIGS. 5A-5B show a flowchart of a procedure for managing cached data in the node of FIG. 2, according to an embodiment of the invention.
Figure 5B:
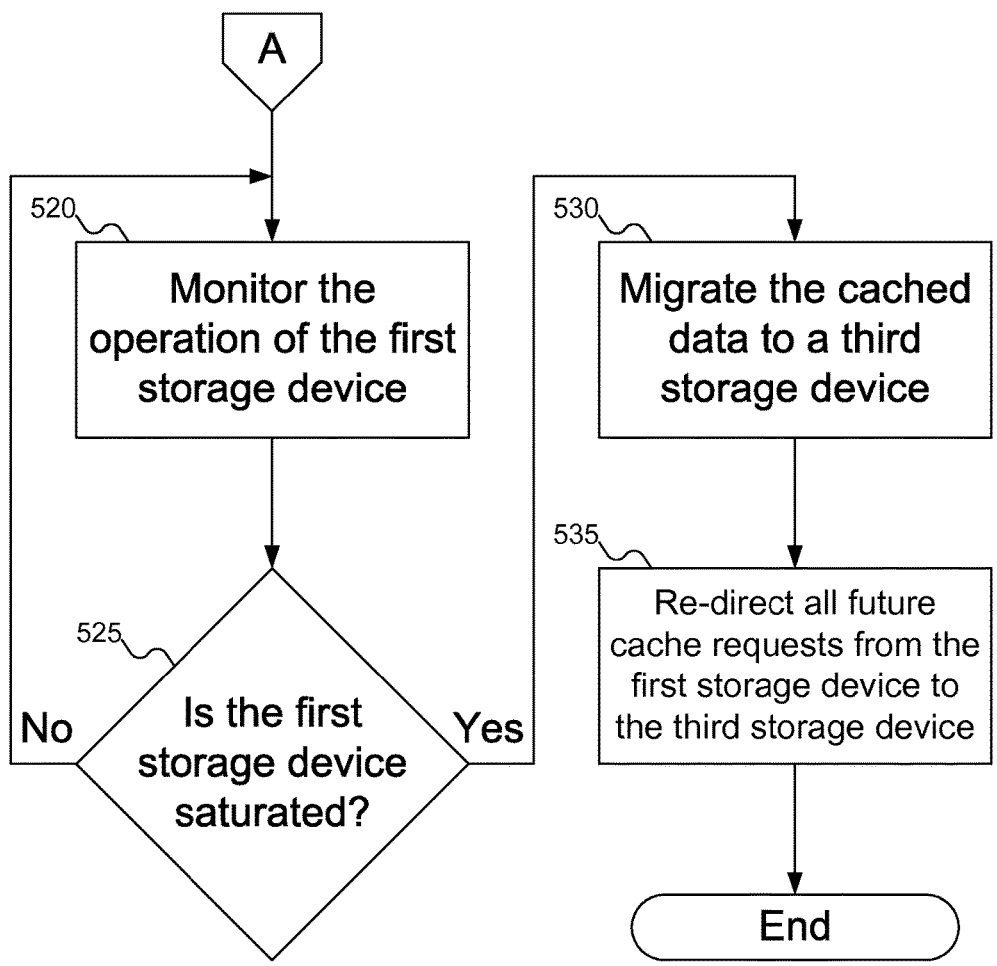

FIGS. 5A-5B show a flowchart of a procedure for managing cached data in the node of FIG. 2, according to an embodiment of the invention. In FIG. 5A, at block 505, resource monitor 205 determines the capabilities of one or more storage devices on the cluster node. At block 510, resource scheduler 210 caches data on a storage device. At block 515, replicator 310 replicates the data on a second storage device, for fault tolerance.

At block 520 (FIG. 5B) resource monitor 205 monitors the performance of the storage device caching the data. As described above, there can be more than one storage device caching data: at block 520, any or all storage devices caching data can be monitored. In addition, storage devices not currently caching data can also be monitored. By monitoring other storage devices, resource scheduler 210 can select an appropriate storage device for data migration/request re-direction if a storage device caching data becomes saturated. At block 525, resource scheduler 210 determines if the storage device caching the data is saturated (or approaching saturation). If so, then at block 530 resource scheduler 210 migrates the data to another cached device, and at block 535 resource scheduler 210 can re-direct future cache requests destined for the first storage device to the third storage device.

In FIG. 5 (and in the other flowcharts below), one embodiment of the invention is shown. But a person skilled in the art will recognize that other embodiments of the invention are also possible, by changing the order of the blocks, by omitting blocks, or by including links not shown in the drawings. For example, block 515 can be omitted to eliminate the fault tolerance of the system, but maintain the caching operations. Or after block 535, control can return to block 520 for more monitoring of the devices. All such variations of the flowcharts are considered to be embodiments of the invention, whether expressly described or not.

There is an interesting interplay between how the resource scheduler handles data migration when a storage device becomes saturated and how the resource scheduler handles data replication for fault tolerance. When data is replicated, in some embodiments it is replicated to a storage device that has a priority no higher than the storage device that provides the caching service. But when the resource scheduler migrates data from a higher priority device to a lower priority device, the replicated data might now be resident on a device with a higher priority than the device now caching the data.

There are two ways to address this situation. One solution is to do nothing: the replication is simply to provide fault tolerance, and the fact that the data is replicated on a higher priority device than the cached data is simply a curious artifact. (In fact, fault tolerance does not necessarily require replication on a lower priority device: there is no reason why data replication could be performed onto any available device, regardless of priority.) The other solution is to migrate the replicated data to ensure that the replicated data does not have a higher priority than the cached data.

Figure 6:
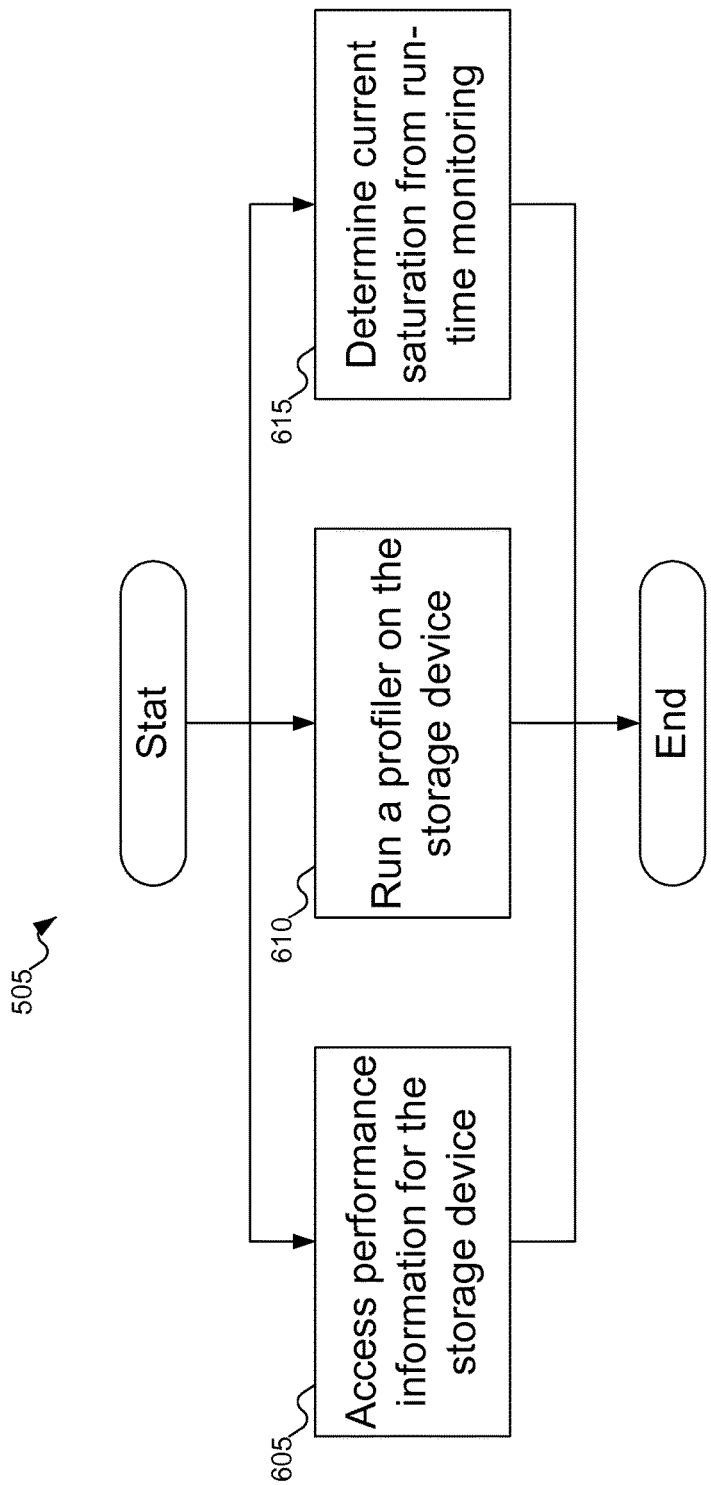
FIG. 6 shows a flowchart of how the resource monitor of FIG. 2 can determine the performance information for storage devices, according to an embodiment of the invention.

FIG. 6 shows a flowchart of how resource monitor 205 of FIG. 2 can determine the performance information for storage devices, according to an embodiment of the invention. In FIG. 6, at block 605, resource monitor 205 can access performance information for the storage device. Resource monitor 205 can access the performance information from the storage device or from some accessible storage, either local or networked. Alternatively, at block 610, resource monitor 205 can run a profiler on the device to determine the device's performance information. Alternatively, at block 615, resource monitor 205 can determine the device's performance information from monitoring the operation of the storage device in real-time.

The various ways to determine performance information shown in FIG. 6 are not mutually exclusive. For example, the storage device might provide performance information as in block 605, but the system might also periodically run a profiler on the storage device as in block 610, to ensure that the storage device is still performing to specification.

Figure 7:
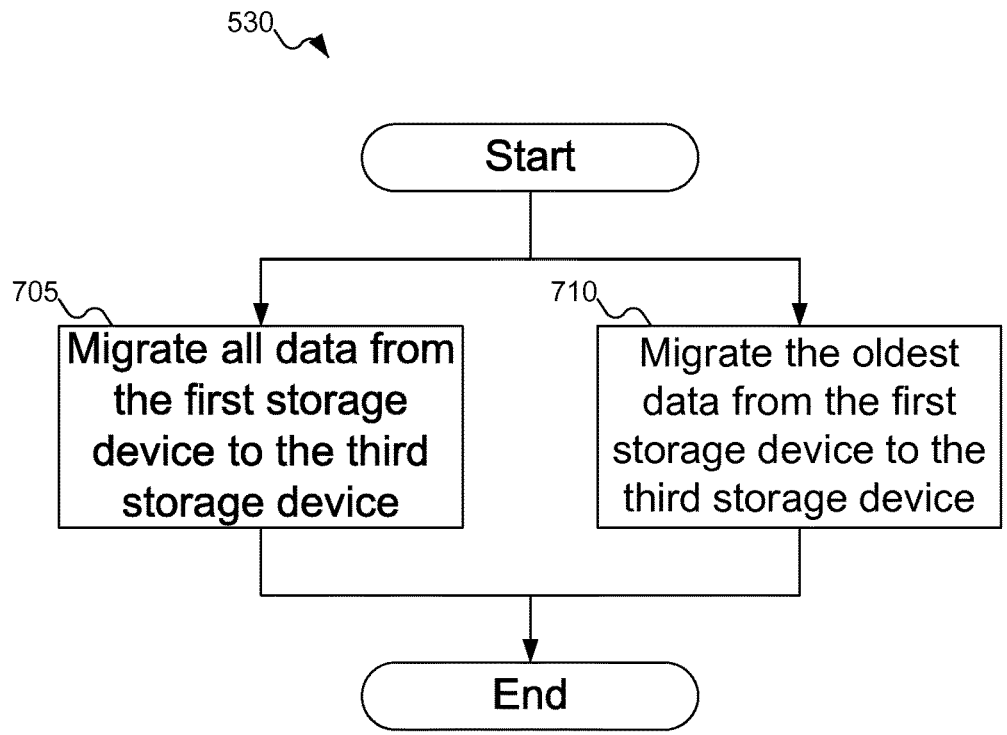
FIG. 7 shows a flowchart of a procedure for migrating cached data when the resource monitor of FIG. 2 determines migration to be appropriate, according to an embodiment of the invention.

FIG. 7 shows a flowchart of a procedure for migrating cached data when the resource monitor of FIG. 2 determines migration to be appropriate, according to an embodiment of the invention. In FIG. 7, at block 705, resource scheduler 210 can migrate all data from the storage device that is at (or near) saturation to another device. Migration can include copying the data from one storage device to another, and then deleting the migrated data from the first storage device. Alternatively, at block 710, resource scheduler 210 can migrate selected data from the storage device to another device. Which data is selected for migration can be determined by resource scheduler 210 as appropriate: for example, resource scheduler 210 might select the oldest data resident on the storage device for migration, or resource scheduler 210 might select the largest data file(s) resident on the storage device for migration.

Figure 8:
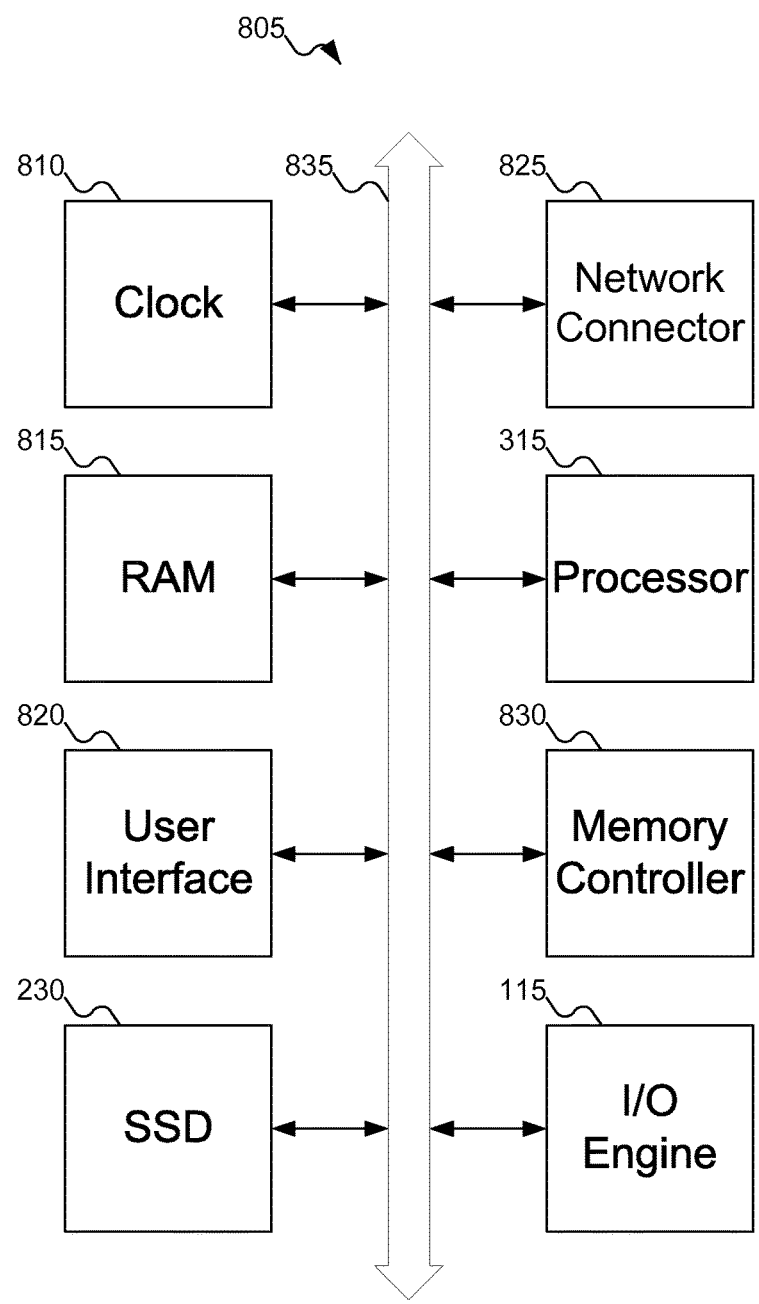
FIG. 8 shows a computer system that can operate as a cluster computing framework node, as described above with reference to FIGS. 2-7.

FIG. 8 shows a computer system that can operate as a cluster computing framework node, as described above with reference to FIGS. 2-7. In FIG. 8, computing system 805 can also include a clock 810, random access memory (RAM) 815, user interface 820, solid state drive/disk (SSD) 230, network connector 825, such as an Ethernet connector, processor 315, and/or memory controller 830, any or all of which may be electrically coupled to system bus 835. I/O engine 115 can correspond to those described in detail above, and as set forth herein, and may also be electrically coupled to the system bus 835. I/O engine 115 can include or otherwise interface with clock 810, random access memory (RAM) 815, user interface 820, solid state drive/disk (SSD) 230, network connector 825, processor 315, and/or memory controller 830.

Embodiments of the invention can extend to the following statements, without limitation:

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate the cached data from the first storage device to the second storage device if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to monitor a bandwidth saturation of the first storage device; and a resource scheduler operative to migrate the cached data from the first storage device to the second storage device if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to monitor a capacity saturation of the first storage device; and a resource scheduler operative to migrate the cached data from the first storage device to the second storage device if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to determine the capabilities of the first storage device and to monitor the first storage device; and a resource scheduler operative to migrate the cached data from the first storage device to the second storage device if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to determine the capabilities of the first storage device and to monitor the first storage device; and a resource scheduler operative to migrate the cached data from the first storage device to the second storage device if the resource monitor indicates that the first storage device is saturated, wherein the resource monitor is operative to access performance information from the first storage device.

An embodiment of the invention includes an in-memory cluster computing framework node, comprising: a processor; a first storage device storing cached data, the first storage device having a first priority; a second storage device having a second priority; a resource monitor operative to determine the capabilities of the first storage device and to monitor the first storage device; and a resource scheduler operative to migrate the cached data from the first storage device to the second storage device if the resource monitor indicates that the first storage device is saturated, wherein the resource monitor includes a profiler to profile the first storage device.

An embodiment of the invention includes an in-memory cluster computing framework node, comprising: a processor; a first storage device storing cached data, the first storage device having a first priority; a second storage device having a second priority; a resource monitor operative to determine the capabilities of the first storage device using a run-time monitor and to monitor the first storage device; and a resource scheduler operative to migrate the cached data from the first storage device to the second storage device if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate the cached data from the first storage device to the second storage device if the resource monitor indicates that the first storage device is saturated, wherein the resource scheduler is operative to select the first storage device to initially cache the data based on information provided by an application that uses the data.

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate the cached data from the first storage device to the second storage device if the resource monitor indicates that the first storage device is saturated, wherein the first priority is higher than the second priority and the resource scheduler is operative to select the first storage device to initially cache the data as a higher priority device.

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate the cached data from the first storage device to the second storage device if the resource monitor indicates that the first storage device is saturated, wherein the first priority is higher than the second priority, and the resource scheduler is operative to select the first storage device to initially cache the data as a higher priority device and to select the second storage device for future data caching if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device having a third priority, wherein the third priority is the same as the first priority.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device having a third priority, wherein the third priority is lower than the first priority.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device having a third priority, the third storage device is in a second in-memory cluster computing framework node.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device having a third priority, the third storage device is in a second in-memory cluster computing framework node, wherein the third priority is the same as the first priority.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device having a third priority, the third storage device is in a second in-memory cluster computing framework node, wherein the third priority is lower than the first priority.

An embodiment of the invention includes an in-memory cluster computing framework node, comprising: a processor; a first storage device storing cached data, the first storage device having a first priority; a second storage device having a second priority; a resource monitor operative to monitor the first storage device; a resource scheduler operative to migrate the cached data from the first storage device to the second storage device if the resource monitor indicates that the first storage device is saturated; and a replicator to replicate the cached data on a third storage device having a third priority, the third storage device is in a second in-memory cluster computing framework node, wherein the third storage device is specified by a user.

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate the cached data from the first storage device to the second storage device if the resource monitor indicates that the first storage device is saturated, wherein the data includes a resilient distributed dataset (RDD) on the first storage device.

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate all cached data from the first storage device to the second storage device if the resource monitor indicates that the first storage device is saturated.

An embodiment of the invention includes an in-memory cluster computing framework node, comprising: a processor; a first storage device storing cached data, the first storage device having a first priority; a second storage device having a second priority; a resource monitor operative to monitor the first storage device; and a resource scheduler operative to migrate an oldest cached data from the first storage device to the second storage device if the resource monitor indicates that the first storage device is saturated.

An embodiment of the invention includes a method for caching data in an in-memory cluster computing framework, comprising: caching a data on a first storage device with a first priority in a cluster node; monitoring the operation of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device including monitoring a bandwidth saturation of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device including monitoring a capacity saturation of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device including determining a capability of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device including determining a capability of the first storage device including accessing performance information from the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device including determining a capability of the first storage device including running a profiler on the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device including determining a capability of the first storage device including determining current bandwidth for the first storage device from run-time monitoring; and if the first storage device is saturated, migrating the cached data to a second storage device with a second priority.

An embodiment of the invention includes a method for caching data in an in-memory cluster computing framework, comprising: caching a data on a first storage device with a first priority in a cluster node, the first storage device selected by an application using the data; monitoring the operation of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node, the first storage device having a higher priority among a plurality of devices; monitoring the operation of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority in the cluster node; and if the first storage device is saturated, re-directing future cache requests for the first storage device in the cluster node in the cluster node to the second storage device.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device, the third storage device having a same priority as the first storage device.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device, the third storage device having a lower priority than the first storage device.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device in a second cluster node.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device in a second cluster node, the third storage device having a same priority as the first storage device.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device in a second cluster node, the third storage device having a lower priority than the first storage device.

An embodiment of the invention includes a method for caching data in an in-memory cluster computing framework, comprising: caching a data on a first storage device with a first priority in a cluster node; monitoring the operation of the first storage device; if the first storage device is saturated, migrating the cached data to a second storage device with a second priority; and replicating the cached data on a third storage device as specified by a user.

An embodiment of the invention includes a method for caching data in an in-memory cluster computing framework, comprising: caching a resilient distributed dataset (RDD) on a first storage device with a first priority in a cluster node; monitoring the operation of the first storage device; and if the first storage device is saturated, migrating the cached data to a second storage device with a second priority.

An embodiment of the invention includes a method for caching data in an in-memory cluster computing framework, comprising: caching a data on a first storage device with a first priority in a cluster node; monitoring the operation of the first storage device; and if the first storage device is saturated, migrating all cached data to a second storage device with a second priority.

An embodiment of the invention includes a method for caching data in an in-memory cluster computing framework, comprising: caching a data on a first storage device with a first priority in a cluster node; monitoring the operation of the first storage device; and if the first storage device is saturated, migrating an oldest cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device including monitoring a bandwidth saturation of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device including monitoring a capacity saturation of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device including determining a capability of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device including determining a capability of the first storage device including accessing performance information from the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device including determining a capability of the first storage device including running a profiler on the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device including determining a capability of the first storage device including determining current bandwidth for the first storage device from run-time monitoring; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node, the first storage device selected by an application using the data; monitoring the operation of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node, the first storage device having a higher priority among a plurality of devices; monitoring the operation of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device, the third storage device having a same priority as the first storage device.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device, the third storage device having a lower priority than the first storage device.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device in a second cluster node.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device in a second cluster node, the third storage device having a same priority as the first storage device.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device in a second cluster node, the third storage device having a lower priority than the first storage device.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; if the first storage device is saturated, migrating the cached data to a second storage device with a second priority; and replicating the cached data on a third storage device as specified by a user.

An embodiment of the invention includes an article, comprising a tangible storage medium, said tangible storage medium having stored thereon non-transitory instructions that, when executed by a machine, result in, comprising: caching a resilient distributed dataset (RDD) on a first storage device with a first priority in a cluster node; monitoring the operation of the first storage device; and if the first storage device is saturated, migrating the cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; and if the first storage device is saturated, migrating all cached data to a second storage device with a second priority.

An embodiment of the invention includes an article, comprising a tangible storage medium, said tangible storage medium having stored thereon non-transitory instructions that, when executed by a machine, result in, comprising: caching a data on a first storage device with a first priority in a cluster node; monitoring the operation of the first storage device; and if the first storage device is saturated, migrating an oldest cached data to a second storage device with a second priority.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Embodiments of the inventive concept can include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments can be modified in arrangement and detail without departing from such principles, and can be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. An in-memory cluster computing framework node, comprising:
   a processor;
   a first storage device storing cached data, the first storage device having a first priority ranking the first storage device according to at least one metric;
   a second storage device having a second priority ranking the second storage device according to the at least one metric;
   a resource monitor operative to monitor the first storage device; and
   a resource scheduler operative to migrate the cached data from the first storage device to the second storage device if the resource monitor indicates that the first storage device is approaching a performance characteristic limit according to the at least one metric,
   wherein:
      the first storage device has a first value measuring its performance according to the at least one metric;
      the second storage device has a second value measuring its performance according to the at least one metric; and
      the first priority and the second priority are determined relative to the first value and the second value.

2. The in-memory cluster computing framework node according to claim 1, wherein the resource monitor is operative to determine the capabilities of the first storage device.

3. The in-memory cluster computing framework node according to claim 1, wherein the resource scheduler is operative to select the first storage device to initially cache the data based on information provided by an application that uses the data.

4. The in-memory cluster computing framework node according to claim 1, wherein:
   the first priority is higher than the second priority; and
   the resource scheduler is operative to select the first storage device to initially cache the data as a higher priority device.

5. The in-memory cluster computing framework node according to claim 4, wherein the resource scheduler is operative to select the second storage device for future data caching if the resource monitor indicates that the first storage device is approaching the performance characteristic limit according to the at least one metric.

6. The in-memory cluster computing framework node according to claim 1, further comprising a replicator to replicate the cached data on a third storage device.

7. The in-memory cluster computing framework node according to claim 6, wherein the third storage device is in a second in-memory cluster computing framework node.

8. The in-memory cluster computing framework node according to claim 1, wherein the data includes a resilient distributed dataset (RDD) on the first storage device.

9. The in-memory cluster computing framework node according to claim 1, wherein the resource scheduler is operative to migrate all data from the first storage device to the second storage device.

10. The in-memory cluster computing framework node according to claim 1, wherein the resource scheduler is operative to migrate an oldest data from the first storage device to the second storage device.

11. A method for caching data in an in-memory cluster computing framework, comprising:

caching a data on a first storage device with a first priority in a cluster node, the first priority ranking the first storage device according to at least one metric;

monitoring the operation of the first storage device; and if the first storage device is approaching a performance characteristic limit according to the at least one metric, migrating the cached data to a second storage device with a second priority, the second priority ranking the second storage device according to the at least one metric, wherein:

the first storage device has a first value measuring its performance according to the at least one metric;

the second storage device has a second value measuring its performance according to the at least one metric; and the first priority and the second priority are determined relative to the first value and the second value.

12. The method according to claim 11, wherein monitoring the operation of the first storage device includes determining a capability of the first storage device.

13. The method according to claim 11, wherein caching a data on a first storage device with a first priority in a cluster node includes caching the data on the first storage device in the cluster node, the first storage device selected by an application using the data.

14. The method according to claim 11, wherein caching a data on a first storage device with a first priority in a cluster node includes caching the data on the first storage device in the cluster node, the first storage device having a higher priority among a plurality of devices.

15. The method according to claim 14, further comprising, if the first storage device is approaching the performance characteristic limit according to the at least one metric, re-directing future cache requests for the first storage device in the cluster node in the cluster node to the second storage device.

16. The method according to claim 11, further comprising replicating the cached data on a third storage device.

17. The method according to claim 16, wherein replicating the cached data on a third storage device includes replicating the cached data on the third storage device in a second cluster node.

18. The method according to claim 11, wherein caching a data on a first storage device with a first priority in a cluster node includes caching a resilient distributed dataset (RDD) on the first storage device.

19. The method according to claim 11, wherein migrating the cached data to a second storage device with a second priority includes migrating all data on the first storage device to the second storage device.

20. The method according to claim 11, wherein migrating the cached data to a second storage device with a second priority includes migrating an oldest data on the first storage device to the second storage device.

21. The in-memory cluster computing framework node according to claim 1, wherein the at least one metric is drawn from a set including latency and bandwidth.

22. The method according to claim 11, wherein the at least one metric is drawn from a set including latency and bandwidth.

23. The in-memory cluster computing framework node according to claim 1, wherein the first value and the second value are determined without reference to an application and the application's data.

24. The method according to claim 11, wherein the first value and the second value are determined without reference to an application and the application's data.

* * * * *